(12) United States Patent
Sharma et al.

(10) Patent No.: US 11,860,723 B2
(45) Date of Patent: Jan. 2, 2024

(54) SYSTEMS AND METHODS FOR PARALLELIZING SEQUENTIAL PROCESSING REQUESTS USING PREDICTED CORRECTION DATA

(71) Applicant: Capital One Services, LLC, McLean, VA (US)

(72) Inventors: Sunil Pradhan Sharma, McLean, VA (US); Rajendra Prasad Mokshagundam, McLean, VA (US); Ravikanth Kompella, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 44 days.

(21) Appl. No.: 17/564,024

(22) Filed: Dec. 28, 2021

(65) Prior Publication Data
US 2023/0205617 A1   Jun. 29, 2023

(51) Int. Cl.
| G06F 11/00 | (2006.01) |
| G06F 11/07 | (2006.01) |
| G06N 20/00 | (2019.01) |
| G06F 9/46 | (2006.01) |

(52) U.S. Cl.
CPC ............ *G06F 11/079* (2013.01); *G06F 9/466* (2013.01); *G06F 11/0721* (2013.01); *G06N 20/00* (2019.01)

(58) Field of Classification Search
CPC .... G06F 11/074; G06F 11/0721; G06F 9/466; G06N 20/00

USPC ....................................................... 714/1–57
See application file for complete search history.

(56) References Cited

U.S. PATENT DOCUMENTS

| 10,057,246 | B1 * | 8/2018 | Drozd ................... G06F 21/335 |
| 2004/0215755 | A1 * | 10/2004 | O'Neill ................... G06F 8/658 |
| | | | 717/170 |
| 2006/0161814 | A1 * | 7/2006 | Wocke ................. G06F 18/2137 |
| | | | 714/26 |
| 2009/0235126 | A1 * | 9/2009 | Hosouchi ............ G06F 11/0727 |
| | | | 714/57 |
| 2011/0154340 | A1 * | 6/2011 | Kanemasa .......... G06F 11/3495 |
| | | | 718/100 |
| 2011/0161746 | A1 * | 6/2011 | Ooya ................... G06F 11/0793 |
| | | | 714/57 |
| 2011/0173482 | A1 * | 7/2011 | Penton ................ G06F 11/1641 |
| | | | 714/E11.178 |

(Continued)

*Primary Examiner* — Sarai E Butler
(74) *Attorney, Agent, or Firm* — Perkins Coie LLP (57) ABSTRACT

Methods and systems for parallelizing processes through the use of predicted data are described herein. A requesting system may send processing requests to a processing system. The processing system may need to have a third-party validation system validate the processing requests before proceeding. The processing system may detect errors and generate modified data that is predicted to resolve the errors in obtained processing requests. The modified data may be sent to the validation system in place of the original data that contained errors. While waiting for validation results from the validation system, the modified data may also be sent to the requesting system to confirm that it is correct. By sending the modified data to both the validation system and the requesting system for approval, increased efficiency and parallelization may be achieved.

20 Claims, 5 Drawing Sheets

(56) References Cited

U.S. PATENT DOCUMENTS

| | | | |
|---|---|---|---|
| 2011/0251749 A1* | 10/2011 | Schwarz | B60T 8/1755 |
| | | | 701/31.4 |
| 2015/0074469 A1* | 3/2015 | Cher | G06F 11/008 |
| | | | 714/47.2 |
| 2015/0077469 A1* | 3/2015 | Kohda | B41J 2/14209 |
| | | | 347/40 |
| 2015/0227404 A1* | 8/2015 | Rajagopal | G06F 11/0748 |
| | | | 714/37 |
| 2016/0043938 A1* | 2/2016 | Colpo | H04L 45/22 |
| | | | 709/224 |
| 2016/0306660 A1* | 10/2016 | Ruan | G06F 9/466 |
| 2017/0277544 A1* | 9/2017 | Mizrahi | G06F 9/3861 |
| 2019/0146894 A1* | 5/2019 | Hardy | G06F 11/0757 |
| | | | 714/4.12 |
| 2019/0303195 A1* | 10/2019 | Sundararam | G06F 9/44505 |
| 2022/0043640 A1* | 2/2022 | Srivastava | G06F 11/3688 |
| 2022/0129828 A1* | 4/2022 | Yates | G06N 5/04 |

* cited by examiner

SYSTEMS AND METHODS FOR PARALLELIZING SEQUENTIAL PROCESSING REQUESTS USING PREDICTED CORRECTION DATA

BACKGROUND

In recent years, the need for additional processing resources have increased in tandem with society's reliance on computer systems. Consequently, there is a need to improve the efficiency of computer systems so that they are able to more effectively address society's needs. However, it can be difficult to speed up some software processes without losing accuracy or reliability. For example, it may be difficult to increase the efficiency of some high assurance software processes used to prevent catastrophic errors from occurring, for example, in aircraft safety, financial systems, electric grids, and software that controls other critical infrastructure.

SUMMARY

Conventional computing systems that implement high assurance software processes often are required to perform tasks in serial. Results output by one computing system often have to be verified by a validation system before the results can be used by subsequent computing systems. For example, in conventional systems, a requesting system may send processing requests to a processing system. Due to accuracy or safety requirements, the processing system may need to have a third-party validation system validate the processing requests before proceeding. If an error is detected, the processing system may need to communicate with the requesting system to correct the error and restart the processing request. This conventional process is difficult to parallelize because subsequent systems (e.g., the processing system) cannot perform tasks with output that has not passed validation.

To address these and other issues, non-conventional techniques described herein parallelize the tasks performed by the requesting, processing, and validation systems described above. Parallelization reduces bottleneck and increases efficiency of computing systems because it allows the requesting and validation systems to perform work at the same time.

Parallelization of the processes described above may be achieved by detecting errors in original processing requests and using machine learning to generate data that corrects the errors. The processing system may detect errors and generate modified data that is predicted to resolve the errors in obtained processing requests. The modified data may be sent to the validation system in place of the original data (e.g., the original processing requests) that contained the errors.

However, sending machine learning generated data in place of the original data to be validated creates a novel technical problem because it is possible that the machine learning generated data may be incorrect in some instances. To solve this novel technical problem, the processing system may send the generated data to the requesting system while waiting for the validation system to return results from validating the batch of processing requests. The requesting system can confirm that the modified data may also be sent to the requesting system to confirm that the modifications made to the original processing requests are correct. The requesting system is able to verify the data in parallel with the validation system, which enables the systems to improve efficiency by performing multiple verifications of the same modified processing request in parallel.

A processing system may receive processing requests from a requesting system. The processing requests may be scheduled to be validated by a validation system, for example, because the processing requests correspond to a high assurance software application. For example, the processing requests may correspond to a series of fuselage welds to be performed by a robot welder. The processing system may determine an error in a first processing request of the plurality of processing requests. For example, the first processing request may indicate an incorrect welding temperature. The processing system may generate a modified processing request in response to determining the error in the first processing request and may replace the first processing request with the modified processing request. For example, the processing system may generate a processing request with a corrected welding temperature and replace the incorrect processing request. The processing system may send the processing requests to a validation system for validation. While waiting to receive results from the validation system, the processing system may send the modified processing request to the requesting system for acceptance. The processing system may authenticate the processing results, for example, if the modified processing request is accepted by the requesting system and the validation system validates the batch of processing requests.

Various other aspects, features, and advantages of the disclosure will be apparent through the detailed description of the disclosure and the drawings attached hereto. It is also to be understood that both the foregoing general description and the following detailed description are examples and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion," refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the disclosure. It will be appreciated, however, by those having skill in the art, that the disclosure may be practiced without these specific details or with an equivalent arrangement. In other cases, well-known structures and devices are shown in block diagram form to avoid unnecessarily obscuring the disclosure.

Figure 1:
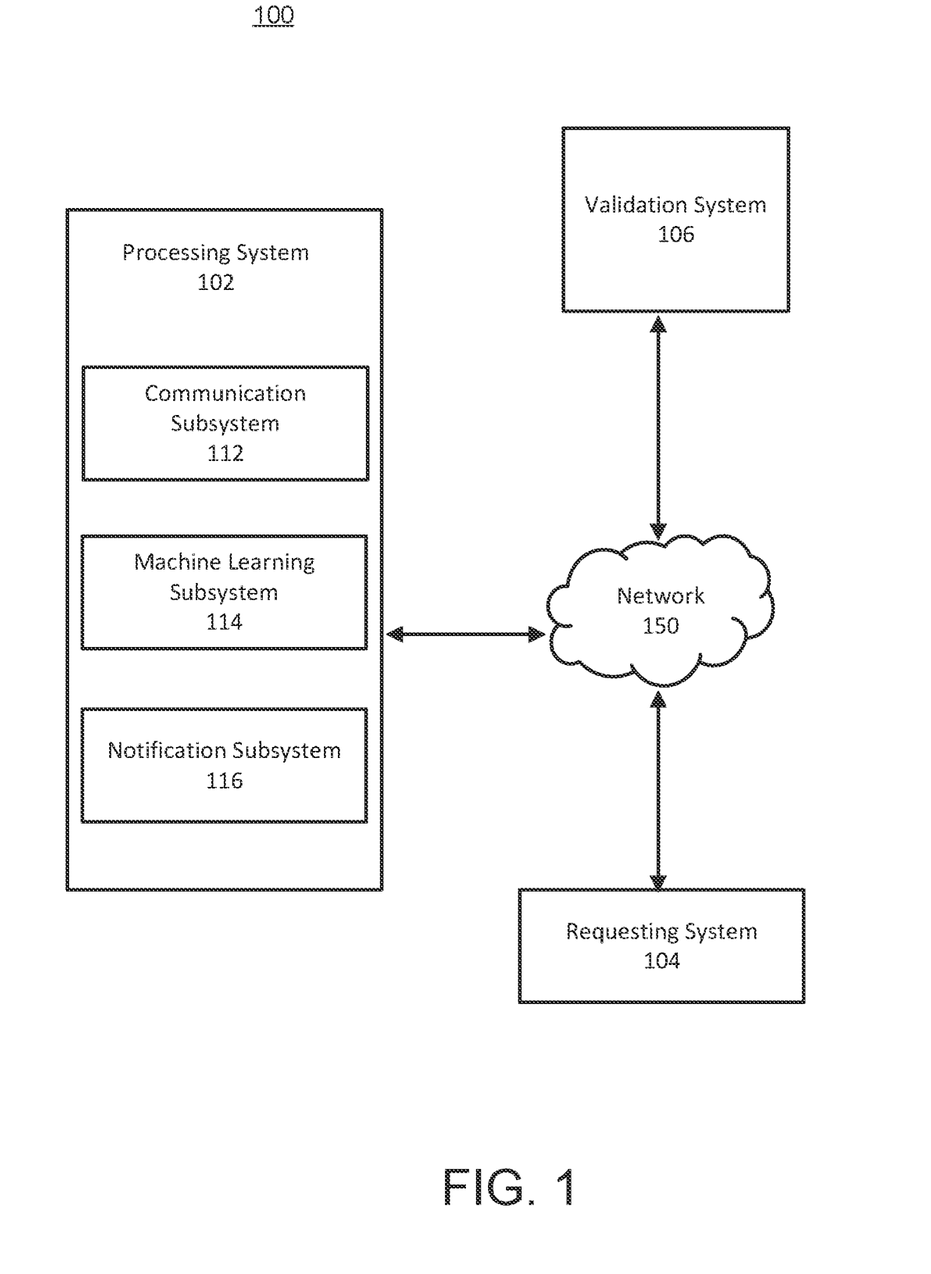
FIG. 1 shows an example system for using predicted data to parallelize processing requests, in accordance with some embodiments.

FIG. 1 shows an example computing system 100 for using predicted data to parallelize processing requests. The system 100 may include a processing system 102, a requesting system 104, and/or a validation system 106. The processing system 102 may include a communication subsystem 112, a machine learning (ML) subsystem 114, and/or a notification subsystem 116. The communication subsystem 112 may receive processing requests from the requesting system 104. A processing request may comprise any type of electronic communication passed to computers. A processing request may be part of a batch of processing requests. The processing request may include a time stamp indicating a deadline by which the processing request should be validated or performed. The processing requests may be transactions between two entities (e.g., credit card transactions between retail stores and customers, transactions between banks and customers, etc.). The plurality of processing requests received from the requesting system 104 may be scheduled to be sent in a first batch for batch processing validation at the validation system 106. The validation system 106 may be required to validate processing requests before they are performed or stored in a database, for example, to make sure there are no errors in the requests. However, this may add additional wait time for the validation system 106 to verify the processing requests. To increase efficiency and parallelization, the processing system 102 may generate data or modified processing requests that are predicted to pass validation and correct any errors in the processing requests.

The processing system 102 may determine, via a first model (e.g., a machine learning model as described in connection with FIGS. 1-3), an error in a first processing request of the plurality of processing requests received from the requesting system 104. The error may indicate that an account type does not match a transaction type. The error may indicate that a dollar amount or an account number is incorrect. In some embodiments, the error may be with the batch of processing requests as a whole. For example, the error may indicate that a volume of transactions is above a threshold. The volume of transactions for a time period (e.g., month, quarter, etc.) may be higher than a corresponding time period of a previous year. The processing system 102 may input the plurality of processing requests into an anomaly detection model and in response to inputting the plurality of processing requests into the anomaly detection model, the processing system 102 may generate, via the anomaly detection model, output indicating that a volume of processing requests received from the first computing system satisfies a threshold. For example, the volume of transactions between a retail store and customers may satisfy the threshold because the volume is more than twice as high as the same month from a year earlier. The anomaly detection model may be Bayesian network, a hidden Markov model, or a variety of other models including a machine learning model as described below in connection with FIG. 3. The anomaly detection model may take as input processing requests and output an indication of whether each processing request is an anomaly or not. The output may comprise a score for each processing request. If the score is greater than a threshold score (e.g., greater than 0.7, 0.8, etc.), then the processing request may be classified as an anomaly. If the score is less than the threshold score, then the processing request may be classified as not an anomaly. The processing system 102 may send an alert to the requesting system 104 after an error is detected. For example, the alert may indicate that the volume of processing requests satisfies the threshold.

The processing system 102 may generate a modified processing request, for example, in response to determining the error in the first processing request. The processing system 102 may use a second model (e.g., a machine learning model as described in connection with FIGS. 1-3) to generate the modified processing request. The second model may be the same model or a different model as the first model used to determine that an error is in a processing request. The second model may be a machine learning model that has been trained to generate modified processing requests that correct errors in processing requests. For example, the machine learning model may be a supervised model that has been trained on historical data comprising processing requests, errors detected in the processing requests, and corrections made to the processing requests.

In some embodiments, the processing system 102 may use a rules-based model to generate a modified processing request. The processing system 102 may determine a rule associated with the error (e.g., via regular expression matching) and generate, based on the rule, a modified processing request (e.g., by replacing an incorrect value with a value indicated by the rule). In some embodiments, the processing system 102 may determine a historical processing request and may replace data of a first field in the first processing request with data of a second field in the historical processing request to generate the modified processing request.

In some embodiments, the processing system 102 may limit the number of processing requests that may be modified for a given batch of processing requests. The number of processing requests may be limited based on a probability that the validation system 106 will accept a corresponding batch of processing requests (e.g., that include the modified processing requests). The probability of the validation system 106 rejecting the batch may increase, for example, as the number of modified processing requests in a batch increase. The processing system 102 may determine a probability of the validation system 106 rejecting a batch of processing requests based on historical rejections from the validation system. For example, the processing system 102 may determine the number of modified processing requests in each batch and calculate a probability of rejection based on the number of modified processing requests. The processing system 102 may determine to limit the number of modified processing requests in a given batch such that the probability of rejection is below a threshold probability. For example, the processing system 102 may determine that including more than ten modified processing requests in a batch increases the probability of rejection beyond ten percent and thus may determine to include up to nine modified processing requests in a batch.

The processing system 102 may replace the first processing request in the plurality of processing requests with the modified processing request. The processing system 102 may transmit the plurality of processing requests (e.g., with the modified processing request) to the validation system 106 for batch processing validation. The validation system 106 may determine whether there are any errors in the batch and/or whether the processing requests may be performed. In some embodiments, the processing system 102 may determine that the validation system 106 does not receive processing requests during a time period. For example, the validation system may be offline during certain hours of the day (e.g., from 6 PM to 8 AM of the following day). In response to determining that the validation system 106 does not receive processing requests during the time period, the processing system may transmit the modified processing request to the requesting system 104 before the time period is over, and may transmit the modified processing request (e.g., included in a batch of processing requests) to the validation system 106 after the time period is over.

While waiting to receive a first validation result from the validation system 106, the processing system 102 may transmit the modified processing request to the requesting system 104 for acceptance. The modified processing request may be the same as the modified processing request that is sent with a batch of processing requests to the validation system 106. Alternatively, the modified processing request sent to the requesting system 104 may be different from the modified processing request sent to the validation system 106. For example, the processing system 102 may send only the modification made (e.g., a change made to the account type) and an ID number of the original processing request so that the requesting system 104 can approve of the modification. The requesting system 104 may be able to confirm whether the modification made to the first processing request is correct or not. The requesting system 104 may be able to confirm that the data generated by a machine learning model is correct. If the modified processing request is incorrect, the requesting system 104 may send a corrected processing request to the processing system 102. The requesting system 104 may send additional data indicating why the modified processing request was incorrect. For example, the additional data may indicate why one account type should be used over another account type in the modified processing request. The processing system 102 may use the corrected processing request and/or the additional data to train a machine learning model that was used to generate the modified processing request to improve precision and/or recall for future modified processing requests.

The processing system 102 may receive validation results from the validation system 106. The validation results may indicate that the plurality of processing requests in the first batch are error free. Alternatively, the validation results may indicate that errors were found in the batch of processing requests. The validation results may indicate the errors and requirements for fixing the errors. The processing system 102 may use the validation results to correct the errors. For example, the processing system 102 may input the validation results into a machine learning model to generate corrections for the errors. Additionally or alternatively, the processing system 102 may send the validation results to the requesting system 104 so that the requesting system 104 can correct the errors. In some embodiments, the modified processing request may fail to pass a validation test. The processing system 102 may receive error data indicating the failure. Based on inputting the error data into a machine learning model (e.g., a machine learning model described below in connection with FIGS. 2-3), the processing system 102 may generate a second modified processing request. The processing system 102 may send the second modified processing request to the requesting system 104 and the validation system 106 for validation.

The processing system 102 may receive, from the requesting system 104, an indication that the modified processing request (e.g., the modified processing request that was sent with other processing requests to the validation system 106) has been accepted and/or is correct. In response to receiving an indication from the requesting system 104 that the modified processing request is correct, the processing system 102 may perform the processing requests. For example, the processing system may finalize one or more transactions between parties indicated in the processing requests. Additionally or alternatively, the processing system 102 may store the processing requests (e.g., with corrected data) in a database.

In some embodiments, the processing system 102 may receive, from the requesting system 104, an indication that the modified processing request is not correct. In response, the processing system 102 may generate an additional modified processing request with corrected data and send the additional modified processing request to the validation system 106. The processing system 102 may determine, based on information received from the requesting system 104 and after sending the plurality of processing requests to the validation system 106, that the modified processing request is incorrect. In response, the processing system 102 may generate, based on the information received from the requesting system 104, an additional modified processing request. The processing system 102 may send the additional modified processing request to the validation system 106.

The processing system 102 may use a reinforcement learning model to perform one or more actions described above. The machine learning model may take as input any of the data described above (e.g., error data, processing request data, validation data, etc.) and may output an action for the processing system 102 to perform. The machine learning model may implement a reinforcement learning policy that includes a set of actions, a set of rewards, and/or a state. For example, FIG. 2 shows an example reinforcement learning policy 200 that may be implemented or used by the machine learning model. The reinforcement learning policy 200 may include an action set 210 that indicates the actions that the machine learning model may use (e.g., the machine learning model may output an action selected from the action set 210). For example, the actions that the machine learning model may select from may include generating a modified processing request (e.g., to correct a detected error as described above), waiting for the requesting system 104 to accept a modified processing request (e.g., if a probability or confidence level associated with a modified processing request fails to satisfy a threshold) before sending the modified processing request to the validation system 106, sending the modified processing request for batch validation, or a variety of other actions.

The reinforcement learning policy 200 may include a reward set (e.g., value set) 220 that indicates the rewards that the machine learning model obtains (e.g., as the result of the sequence of multiple actions from the action set 210). The reward set 220 may indicate that a reward is received and the amount of the reward (e.g., 100 points) if the action is completed before the deadline. The reward set 220 may indicate that the amount of a reward that is received is based on the amount of time that transpires between acceptance of a modified processing request by the requesting system 104 and validation of a corresponding batch of processing requests by the validation system 106. For example, a greater reward may be received if the time between receiving an indication that the requesting system 104 has accepted a modified processing request and receiving an indication that a corresponding batch has been validated is 30 seconds than if the time between receiving each indication is 12 hours. The machine learning model may implement a loss function that optimizes for the maximum reward based on the reward set 220. For example, the machine learning model may be trained to select actions that lead to higher rewards (e.g., that lead to quicker acceptance of modified processing requests by the validation system 106 and the requesting system 104).

The reinforcement learning policy 200 may include a state 230 that indicates the environment or state that the machine learning model is operating in. The machine learning model may output a selection of an action based on the current state. The state 230 may be updated at a predetermined frequency (e.g., daily, every 2 hours, or any other frequency). The machine learning model may output an action in response to each update of the state. For example, if the state is updated at the beginning of each day, the machine learning model may output an action to take based on the action set and/or one or more weights that have been trained/adjusted in the machine learning model. The state may include an indication of outstanding processing requests, the number of errors detected in a batch of processing requests, or a variety of other information. One or more machine learning models implemented/used by the ML subsystem 114 may include a Q-learning network (e.g., a deep Q-learning network) that implements the reinforcement learning policy 200.

The requesting system 104 may be any computing device, including, but not limited to, a laptop computer, a tablet computer, a hand-held computer, smartphone, other computer equipment (e.g., a server or virtual server), including "smart," wireless, wearable, and/or mobile devices.

The processing system 102 may include one or more computing devices described above and/or may include any type of mobile terminal, fixed terminal, or other device. For example, the processing system 102 may be implemented as a cloud-computing system and may feature one or more component devices. A person skilled in the art would understand that system 100 is not limited to the devices shown in FIG. 1. Users may, for example, utilize one or more other devices to interact with devices, one or more servers, or other components of system 100. A person skilled in the art would also understand that while one or more operations are described herein as being performed by particular components of the system 100, those operations may, in some embodiments, be performed by other components of the system 100. As an example, while one or more operations are described herein as being performed by components of the processing system 102, those operations may be performed by components of the requesting system 104, and/or validation system 106. In some embodiments, the various computers and systems described herein may include one or more computing devices that are programmed to perform the described functions.

One or more components of the processing system 102, requesting system 104, and/or validation system 106, may receive content and/or data via input/output (hereinafter "I/O") paths. The one or more components of the processing system 102, the requesting system 104, and/or the validation system 106 may include processors and/or control circuitry to send and receive commands, requests, and other suitable data using the I/O paths. The control circuitry may include any suitable processing, storage, and/or I/O circuitry. Each of these devices may include a user input interface and/or user output interface (e.g., a display) for use in receiving and displaying data. It should be noted that in some embodiments, the processing system 102, the requesting system 104, and/or the validation system 106 may have neither user input interfaces nor displays and may instead receive and display content using another device (e.g., a dedicated display device such as a computer screen and/or a dedicated input device such as a remote control, mouse, voice input, etc.).

One or more components and/or devices in the system 100 may include electronic storages. The electronic storages may include non-transitory storage media that electronically stores information. The electronic storage media of the electronic storages may include one or both of (a) system storage that is provided integrally (e.g., substantially non-removable) with servers or client devices or (ii) removable storage that is removably connectable to the servers or client devices via, for example, a port (e.g., a Universal Serial Bus (USB) port, a firewire port, etc.) or a drive (e.g., a disk drive, etc.). The electronic storages may include one or more of optically readable storage media (e.g., optical discs, etc.), magnetically readable storage media (e.g., magnetic tape, magnetic hard drive, floppy drive, etc.), electrical charge-based storage media (e.g., EEPROM, random access memory (RAM), etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 1 also includes a network 150. The network 150 may be the Internet, a mobile phone network, a mobile voice or data network (e.g., a 5G or LTE network), a cable network, a satellite network, a combination of these networks, or other types of communications networks or combinations of communications networks. The devices in FIG. 1 (e.g., processing system 102, the requesting system 104, and/or the validation system 106) may communicate (e.g., with each other or other computing systems not shown in FIG. 1) via the network 150 using one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The devices in FIG. 1 may include additional communication paths linking hardware, software, and/or firmware components operating together. For example, the processing system 102, any component of the processing system (e.g., the communication subsystem 112, the ML subsystem 114, and/or the notification subsystem 116), the requesting system 104, and/or the validation system 106 may be implemented by one or more computing platforms.

Figure 2:
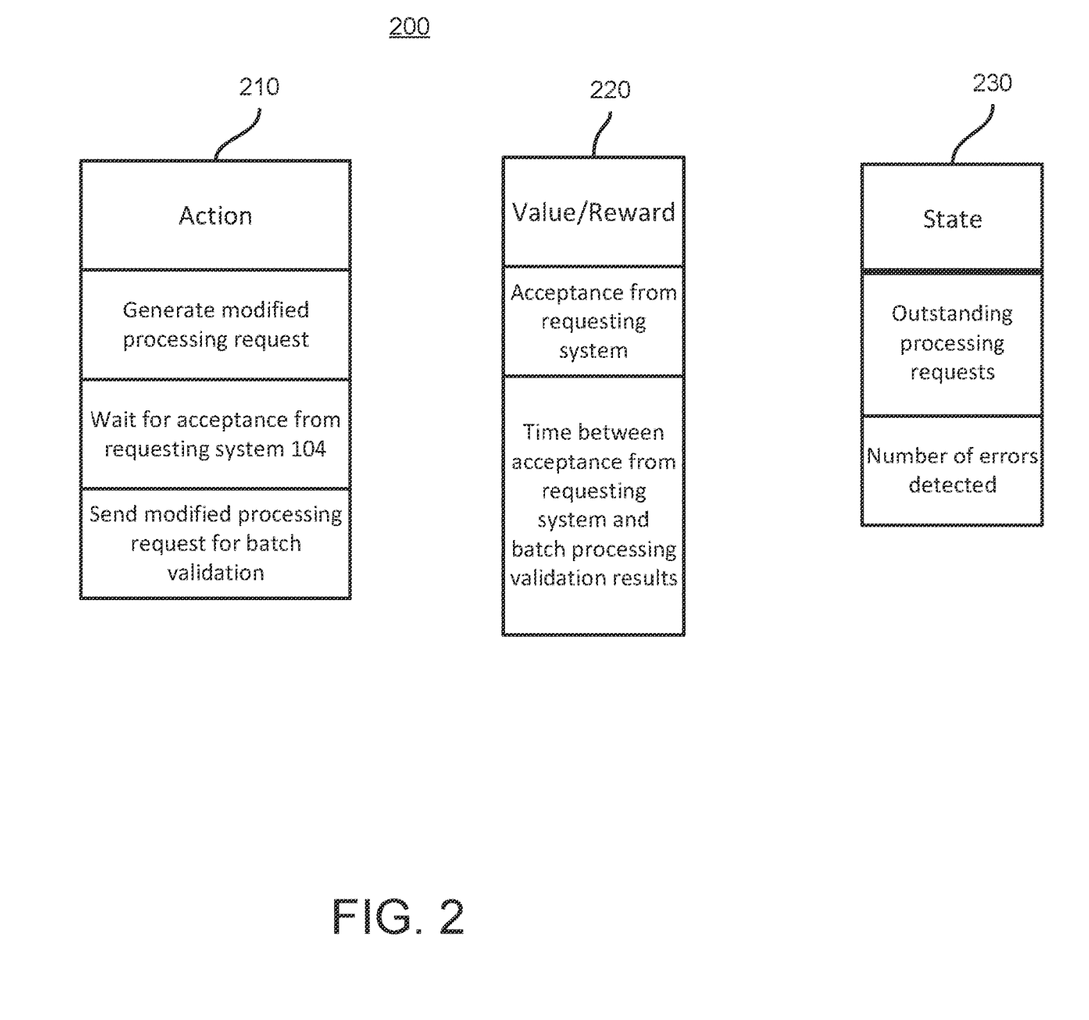
FIG. 2 shows an example reinforcement learning policy, in accordance with some embodiments.
Figure 3:
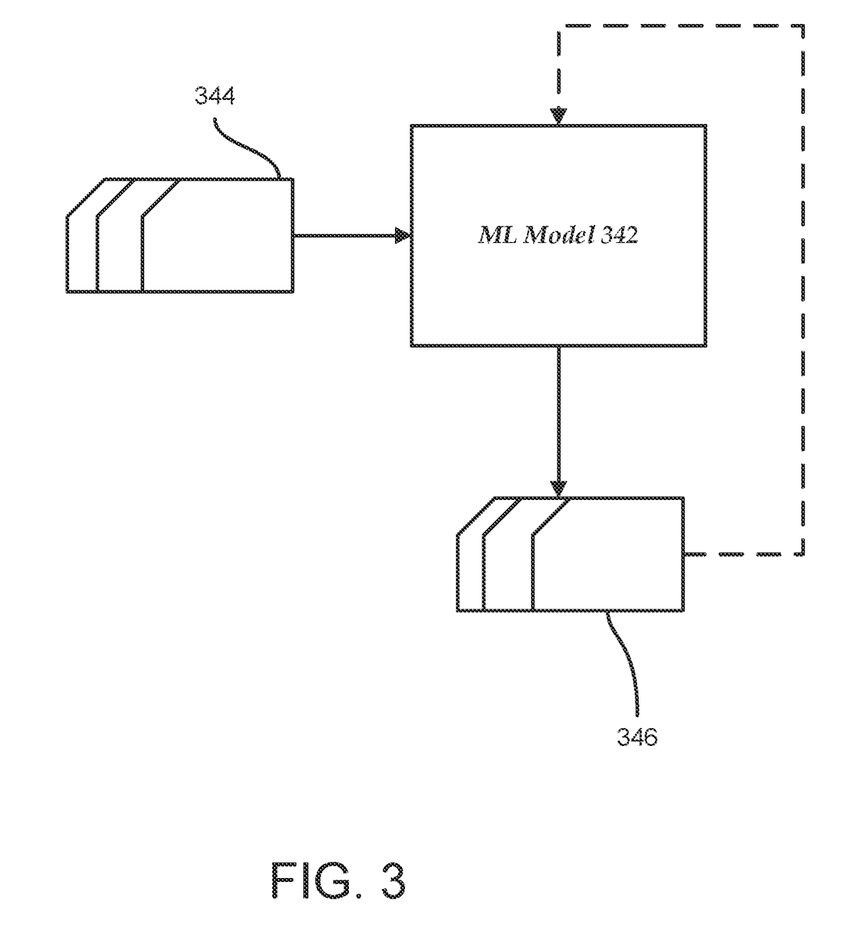
FIG. 3 shows an example machine learning model, in accordance with some embodiments.

One or more machine learning models discussed above may be implemented (e.g., in part), for example, as shown in FIGS. 1-3. With respect to FIG. 3, machine learning model 342 may take inputs 344 and provide outputs 346. In one use case, outputs 346 may be fed back to machine learning model 342 as input to train machine learning model 342 (e.g., alone or in conjunction with user indications of the accuracy of outputs 346, labels associated with the inputs, or with other reference feedback information). In another use case, machine learning model 342 may update its configurations (e.g., weights, biases, or other parameters) based on its assessment of its prediction (e.g., outputs 346) and reference feedback information (e.g., user indication of accuracy, reference labels, or other information). In another example use case, machine learning model 342 is a neural network and connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 342 may be trained to generate results (e.g., modified processing requests, predicted actions as part of a reinforcement learning model, etc.) with better recall and/or precision.

In some embodiments, the machine learning model 342 may include an artificial neural network. In some embodiments, machine learning model 342 may include an input layer and one or more hidden layers. Each neural unit of the machine learning model may be connected with one or more other neural units of the machine learning model 342. Such connections can be enforcing or inhibitory in their effect on the activation state of connected neural units. Each individual neural unit may have a summation function which combines the values of all of its inputs together. Each connection (or the neural unit itself) may have a threshold function that a signal must surpass before it propagates to other neural units. The machine learning model 342 may be self-learning and/or trained, rather than explicitly programmed, and may perform significantly better in certain areas of problem solving, as compared to computer programs that do not use machine learning. During training, an output layer of the machine learning model 342 may correspond to a classification, and an input known to correspond to that classification may be input into an input layer of the machine learning model during training. During testing, an input without a known classification may be input into the input layer, and a determined classification may be output. For example, the classification may be an indication of whether an action is predicted to be completed by a corresponding deadline or not. The machine learning model 342 trained by the machine learning subsystem 114 may include one or more embedding layers at which information or data (e.g., any data or information discussed above in connection with FIGS. 1-3) is converted into one or more vector representations. The one or more vector representations of the message may be pooled at one or more subsequent layers to convert the one or more vector representations into a single vector representation.

The machine learning model 342 may be structured as a factorization machine model. The machine learning model 342 may be a non-linear model and/or supervised learning model that can perform classification and/or regression. For example, the machine learning model 342 may be a general-purpose supervised learning algorithm that the system uses for both classification and regression tasks. Alternatively, the machine learning model 342 may include a Bayesian model configured to perform variational inference, for example, to predict whether an action will be completed by the deadline, and/or a communication protocol to use for sending a message (e.g., a reminder message).

Figure 4:
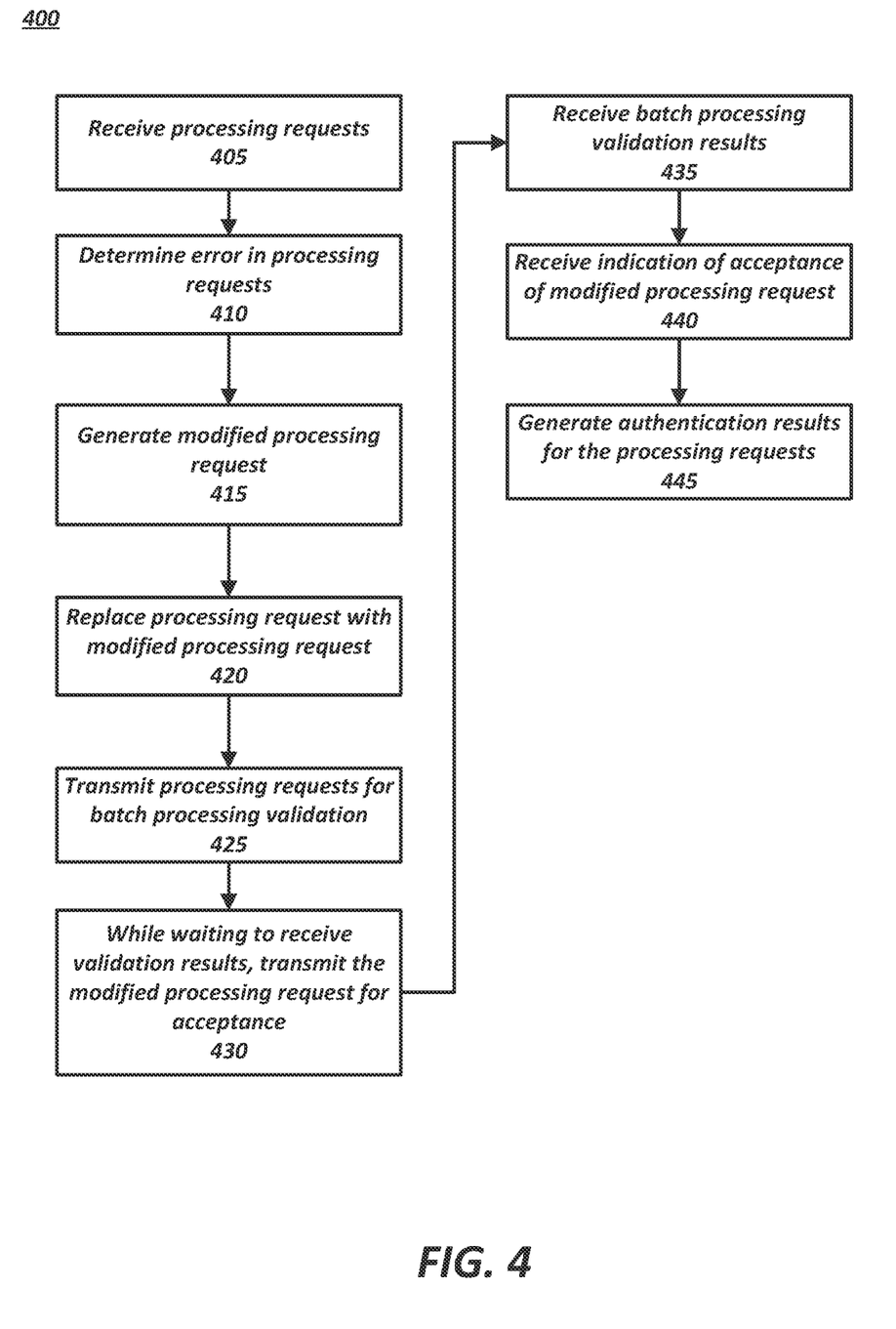
FIG. 4 shows an example flowchart of the actions involved in parallelizing processing requests, in accordance with some embodiments.

FIG. 4 shows an example flowchart of the actions involved in parallelizing processing requests. For example, process 400 may represent the actions taken by one or more devices shown in FIGS. 1-3 and described above. At 405, processing system 102 (e.g., using one or more components in system 100 (FIG. 1) and/or computer system 500 via network interface 540 (FIG. 5)) receives processing requests. The processing requests may comprise transaction data between the requesting system 104 and a customer (e.g., credit card transactions, bank transactions, etc.). The processing requests may be scheduled to be sent in a first batch for batch processing validation at a second computing system (e.g. the validation system 106). For example, the processing requests may include credit card transactions between a retailer and customers. The credit card transactions may be sent by a computing system of the retailer to the processing system 102.

At 410, processing system 102 (e.g., using one or more components in system 100 (FIG. 1) and/or computing system 500 via one or more processors 510a-510n and system memory 520 (FIG. 5)) determines an error in the received processing requests. For example, the error may be an incorrect payment amount, an incorrect account number, or a variety of other errors. The error may be detected using a machine learning model. By detecting errors, the processing system 102 may be able to increase the efficiency of the transaction settlement process because the errors may be corrected before validation as described in more detail below.

At 415, processing system 102 (e.g., using one or more components in system 100 (FIG. 1) and/or computing system 500 via one or more processors 510a-510n, I/O interface 550, and/or system memory 520 (FIG. 5)) generates a modified processing request. The modified processing request may be generated in response to determining the error in the first processing request. The modified processing request may be generated via a machine learning model trained to generate modified processing requests that correct errors in processing requests. For example, a machine learning model may be used to generate output to correct a transaction amount field that was determined to be erroneous at 410. By generating corrections for the errors, the processing system 102 may enable the validation system 106 to validate the transactions in one validation check without additional back and forth between the validation system 106 and the requesting system 104.

At 420, processing system 102 (e.g., using one or more components in system 100 (FIG. 1) and/or computing system 500 via one or more processors 510a-510n (FIG. 5)) replaces a processing request with the modified processing request generated at 415. For example, a processing request with an incorrect account type may be replaced with a processing request that has an account type that is predicted to be correct.

At 425, processing system 102 (e.g., using one or more components in system 100 (FIG. 1) and/or computing system 500 (FIG. 5)) transmits the processing requests for batch processing validation. The transmitted processing requests may include the modified processing request. For example, the processing system 102 may send a batch of processing requests (e.g., comprising each processing request received in the last 24 hours) to the validation system 106. One or more of the processing requests may contain data generated (e.g., by a machine learning model) to correct an error in a corresponding processing request.

At 430, processing system 102 (e.g., using one or more components in system 100 (FIG. 1) and/or computing system 500 via the network interface 540 (FIG. 5)) transmits the modified processing request for acceptance by the requesting system 104 while waiting to receive validation results from the validation system 106. For example, the modified processing request generated at 415 may be sent to the requesting system 104. The requesting system 104 may have additional data (e.g., time of sale, credit card number, name of customer, etc.) that can be used to determine whether the modification made to the processing request is correct.

At 435, processing system 102 (e.g., using one or more components in system 100 (FIG. 1) and/or computing system 500 (FIG. 5)) may receive batch processing validation results from the validation system 106. The validation results may indicate that the processing requests transmitted, by the processing system 102 and to the validation system 106, do not contain any errors. For example, the validation results may indicate that account type in the modified processing request is correct.

At 440, processing system 102 (e.g., using one or more components in system 100 (FIG. 1) and/or computing system 500 (FIG. 5)) receives, from the requesting system 104, an indication that the modified processing request is correct. Alternatively, the requesting system 104 may indicate that the modified processing request is incorrect. The requesting system 104 may send an additional modified processing request that corrects the error in the original processing request.

At 445, processing system 102 (e.g., using one or more components in system 100 (FIG. 1) and/or computing system 500 (FIG. 5)) generates authentication results for the processing requests. The authentication results may indicate that the processing requests may be stored in a database. The processing system 102 may perform the processing requests, for example, in response to receiving indications from the validation system 106 and the requesting system 104 that the processing requests (e.g., including any modified processing requests) are correct.

It is contemplated that the actions or descriptions of FIG. 4 may be used with any other embodiment of this disclosure. In addition, the actions and descriptions described in relation to FIG. 4 may be done in alternative orders or in parallel to further the purposes of this disclosure. For example, each of these actions may be performed in any order, in parallel, or simultaneously to reduce lag or increase the speed of the system or method. Furthermore, it should be noted that any of the devices or equipment discussed in relation to FIGS. 1-3 could be used to perform one or more of the actions in FIG. 4.

Figure 5:
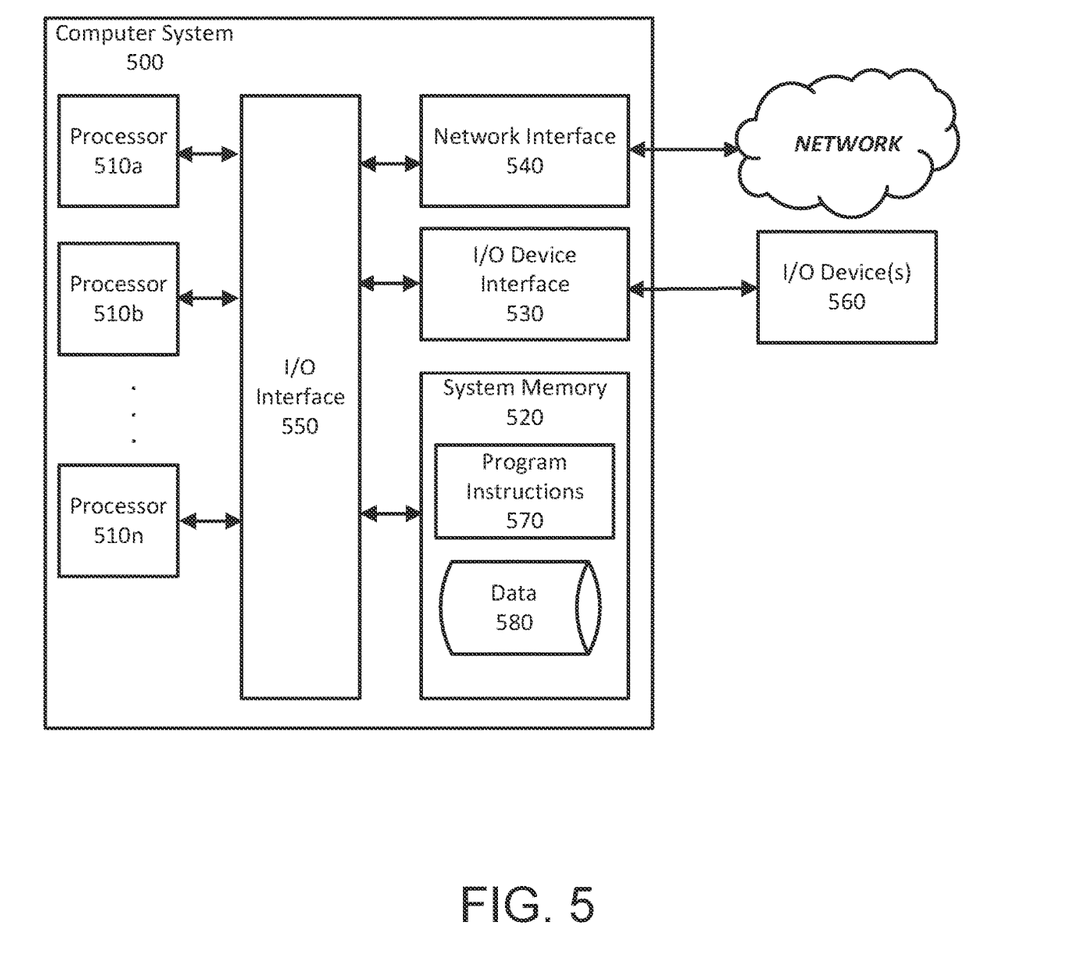
FIG. 5 shows an example computing system that may be used in accordance with some embodiments.

FIG. 5 is a diagram that illustrates an exemplary computing system 500 in accordance with embodiments of the present technique. Various portions of systems and methods described herein may include or be executed on one or more computer systems similar to computing system 500. Further, processes and modules described herein may be executed by one or more processing systems similar to that of computing system 500.

Computing system 500 may include one or more processors (e.g., processors 510*a*-510*n*) coupled to system memory 520, an I/O device interface 530, and a network interface 540 via an I/O interface 550. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and I/O operations of computing system 500. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 520). Computing system 500 may be a units-processor system including one processor (e.g., processor 510*a*), or a multi-processor system including any number of suitable processors (e.g., 510*a*-510*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 500 may include a plurality of computing devices (e.g., distributed computer systems) to implement various processing functions.

I/O device interface 530 may provide an interface for connection of one or more I/O devices 560 to computer system 500. I/O devices may include devices that receive input (e.g., from a user) or output information (e.g., to a user). I/O devices 560 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 560 may be connected to computer system 500 through a wired or wireless connection. I/O devices 560 may be connected to computer system 500 from a remote location. I/O devices 560 located on a remote computer system, for example, may be connected to computer system 500 via a network and network interface 540.

Network interface 540 may include a network adapter that provides for connection of computer system 500 to a network. Network interface may 540 may facilitate data exchange between computer system 500 and other devices connected to the network. Network interface 540 may support wired or wireless communication. The network may include an electronic communication network, such as the Internet, a local area network (LAN), a wide area network (WAN), a cellular communications network, or the like.

System memory 520 may be configured to store program instructions 570 or data 580. Program instructions 570 may be executable by a processor (e.g., one or more of processors 510*a*-510*n*) to implement one or more embodiments of the present techniques. Instructions 570 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 520 may include a tangible program carrier having program instructions stored thereon. A tangible program carrier may include a non-transitory computer readable storage medium. A non-transitory computer readable storage medium may include a machine-readable storage device, a machine-readable storage substrate, a memory device, or any combination thereof. Non-transitory computer readable storage medium may include non-volatile memory (e.g., flash memory, ROM, PROM, EPROM, EEPROM memory), volatile memory (e.g., RAM, static random access memory (SRAM), synchronous dynamic RAM (SDRAM)), bulk storage memory (e.g., CD-ROM and/or DVD-ROM, hard-drives), or the like. System memory 520 may include a non-transitory computer readable storage medium that may have program instructions stored thereon that are executable by a computer processor (e.g., one or more of processors 510a-510n) to cause the subject matter and the functional operations described herein. A memory (e.g., system memory 520) may include a single memory device and/or a plurality of memory devices (e.g., distributed memory devices).

I/O interface 550 may be configured to coordinate I/O traffic between processors 510a-510n, system memory 520, network interface 540, I/O devices 560, and/or other peripheral devices. I/O interface 550 may perform protocol, timing, or other data transformations to convert data signals from one component (e.g., system memory 520) into a format suitable for use by another component (e.g., processors 510a-510n). I/O interface 550 may include support for devices attached through various types of peripheral buses, such as a variant of the Peripheral Component Interconnect (PCI) bus standard or the USB standard.

Embodiments of the techniques described herein may be implemented using a single instance of computer system 500 or multiple computer systems 500 configured to host different portions or instances of embodiments. Multiple computer systems 500 may provide for parallel or sequential processing/execution of one or more portions of the techniques described herein.

Those skilled in the art will appreciate that computer system 500 is merely illustrative and is not intended to limit the scope of the techniques described herein. Computer system 500 may include any combination of devices or software that may perform or otherwise provide for the performance of the techniques described herein. For example, computer system 500 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 500 may also be connected to other devices that are not illustrated and/or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. In some embodiments, some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present disclosure may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine-readable medium. In some cases, third-party content delivery networks may host some or all of the information conveyed over networks, in which case, to the extent information (e.g., content) is said to be supplied or otherwise provided, the information may be provided by sending instructions to retrieve that information from a content delivery network.

Due to costs constraints, some features disclosed herein may not be presently claimed and may be claimed in later filings, such as continuation applications or by amending the present claims. Similarly, due to space constraints, neither the Abstract nor the Summary section of the present document should be taken as containing a comprehensive listing of all such disclosures or all aspects of such disclosures.

It should be understood that the description and the drawings are not intended to limit the disclosure to the particular form disclosed, but to the contrary, the intention is to cover all modifications, equivalents, and alternatives falling within the spirit and scope of the present disclosure as defined by the appended claims. Further modifications and alternative embodiments of various aspects of the disclosure will be apparent to those skilled in the art in view of this description. Accordingly, this description and the drawings are to be construed as illustrative only and are for the purpose of teaching those skilled in the art the general manner of carrying out the disclosure. It is to be understood that the forms of the disclosure shown and described herein are to be taken as examples of embodiments. Elements and materials may be substituted for those illustrated and described herein, parts and processes may be reversed or omitted, and certain features of the disclosure may be utilized independently, all as would be apparent to one skilled in the art after having the benefit of this description of the disclosure. Changes may be made in the elements described herein without departing from the spirit and scope of the disclosure as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y," "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing actions A, B, C, and D) encompasses both all such attributes or functions being mapped to all such objects and subsets of the attributes or functions being mapped to subsets of the attributes or functions (e.g., both all processors each performing actions A-D, and a case in which processor 1 performs action A, processor 2 performs action B and part of action C, and processor 3 performs part of action C and action D), unless otherwise indicated. Further, unless otherwise indicated, statements that one value or action is "based on" another condition or value encompass both instances in which the condition or value is the sole factor and instances in which the condition or value is one factor among a plurality of factors. The term "each" is not limited to "each and every" unless indicated otherwise. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: receiving, from a first computing system, a plurality of processing requests; determining, via a first model, an error in a first processing request of the plurality of processing requests; in response to determining the error in the first processing request, generating a modified processing request using a second model; replacing the first processing request in the plurality of processing requests with the modified processing request; transmitting the plurality of processing requests to the second computing system for batch processing validation; while waiting to receive a first validation result of the plurality of processing requests from the second computing system, transmitting the modified processing request to the first computing system for acceptance; receiving, from the second computing system, the first validation result; receiving, from the first computing system, a second approval, wherein the second approval indicates that the modified processing request is accepted; and in response to receiving the second approval, authenticating the plurality of processing requests.

2. The method of any of the preceding embodiments, wherein determining an error comprises: generating, via the first model, a probability indicating whether the first processing request comprises an error; and based on determining that the probability satisfies a threshold, determining an error exists in the first processing request.

3. The method of any of the preceding embodiments, further comprising: receiving error data indicating that a second plurality of processing requests did not pass the verification test; based on inputting the error data into a machine learning model, generating a second modified processing request; and sending the second modified processing request to the first computing system and the second computing system.

4. The method of any of the preceding embodiments, wherein generating modified processing requests comprises: determining a rule associated with the error; and generating, based on the rule, a modified processing request.

5. The method of any of the preceding embodiments, wherein determining an error in the first processing request comprises: inputting the plurality of processing requests into an anomaly detection model; and in response to inputting the plurality of processing requests into the anomaly detection model, generating, via the anomaly detection model, output indicating that a volume of processing requests received from the first computing system satisfies a threshold.

6. The method of any of the preceding embodiments, wherein the sending the modified processing request to the first computing system comprises sending an alert indicating that the volume of processing requests satisfies the threshold.

7. The method of any of the preceding embodiments, wherein determining one or more errors in the plurality of processing requests comprises: inputting the plurality of processing requests into an anomaly detection model; and in response to inputting the plurality of processing requests into the anomaly detection model, generating, via the anomaly detection model, output indicating that an account indicated by the processing requests does not match other data of the processing requests.

8. The method of any of the preceding embodiments, wherein generating modified processing requests comprises: determining a historical processing request generated during a month of a previous year; and replacing data of a first field in the processing requests with data of a second field in the historical processing request.

9. The method of any of the preceding embodiments, further comprising: determining that the second computing system does not receive processing transactions during a time period, wherein the modified processing request is transmitted to the first computing system before the time period is over, and wherein the plurality of processing requests are transmitted to the second computing system after the time period is over.

17

10. The method of any of the preceding embodiments, further comprising: determining, based on information received from the first computing system and after sending the plurality of processing requests to the second computing system, that the modified processing request is incorrect; generating, based on the information received from the first computing system, additional modified processing requests; and sending the additional modified processing requests to the second computing system.

11. A tangible, non-transitory, machine-readable medium storing instructions that, when executed by a data processing apparatus, cause the data processing apparatus to perform operations comprising those of any of embodiments 1-10.

12. A system comprising: one or more processors; and memory storing instructions that, when executed by the processors, cause the processors to effectuate operations comprising those of any of embodiments 1-10.

13. A system comprising means for performing any of embodiments 1-10.

What is claimed is:

1. One or more non-transitory, computer readable media comprising instructions that, when executed by one or more processors, causes operations comprising:
- in response to determining, via a first model, an error in a first processing request of a set of processing requests that are received from a requesting computing system and scheduled to be sent for batch processing validation at a validation computing system, modifying the set of processing requests to include a modified processing request generated via a second model in lieu of including the first processing request, wherein the second model is trained to generate modified processing requests that correct errors in processing requests;
- transmitting, in parallel, (i) an approval request for acceptance of the modified processing request to the requesting computing system and (ii) the modified set of processing requests to the validation computing system for batch processing validation before receiving an approval from the requesting computing system indicating that the modified processing request has been accepted; and
- in response to receiving the approval from the requesting computing system and receiving a validation result from the validation computing system indicating that the modified processing request is valid, authenticating the modified processing request.

2. The media of claim 1, wherein the second model comprises a machine learning model, the operations further comprising:
- generating, via the machine learning model, the modified processing request and a confidence level associated with the modified processing request,
- wherein transmitting the modified set of processing requests to the validation computing system comprises, in response to the confidence level satisfying a confidence threshold, transmitting the modified set of processing requests to the validation computing system before receiving the approval from the requesting computing system indicating that the modified processing request has been accepted.

3. The media of claim 2, the operations further comprising:
- generating, via the machine learning model, a second modified processing request to replace a second processing request of a second set of processing requests that are received from the requesting computing system and scheduled to be sent for batch processing validation at the validation computing system; and
- in response to a second confidence level associated with the modified processing request failing to satisfy the confidence threshold, determining not to transmit the second modified processing request to the validation computing system before receiving a given approval from the requesting computing system indicating the second modified processing request has been accepted, and instead transmitting the second modified processing request to the validation computing system after receiving the given approval from the requesting computing system.

4. The media of claim 1, the operations further comprising:
- inputting the set of processing requests into an anomaly detection model; and
- in response to inputting the set of processing requests into the anomaly detection model, generating, via the anomaly detection model, output indicating that a volume of processing requests received from the first computing system satisfies a threshold.

5. The media of claim 1, the operations further comprising:
- generating, via the second model, at least one modified processing request to replace at least one processing request scheduled to be sent to the validation computing system;
- transmitting, in parallel, (i) at least one approval request for acceptance of the at least one modified processing request to the requesting computing system and (ii) the at least one modified processing request to the validation computing system before receiving, from the requesting computing system, an indication of whether the at least one modified processing request has been accepted; and
- in response to receiving a given indication from the requesting computing system that the at least one modified processing request has not been accepted, and despite receiving at least one validation result from the validation computing system indicating that the at least one modified processing request is valid, determining not to authenticate the at least one modified processing request.

6. The media of claim 1, wherein the validation result indicates that the modified set of processing requests are error-free, and
- wherein authenticating the modified processing request comprises authenticating the modified set of processing requests in response to receiving the approval from the requesting computing system and receiving the validation result from the validation computing system indicating that the modified set of processing requests are error-free.

7. A method comprising:
- determining, via a first model, a potential error with a first processing request of a set of processing requests that are received from a requesting computing system and scheduled to be sent for batch processing validation at a validation computing system;
- modifying, based on the determination of the potential error with the first processing request, the set of processing requests to include a modified processing request generated via a second model in lieu of including the first processing request;
- transmitting, in parallel, (i) an approval request for acceptance of the modified processing request to the requesting computing system and (ii) the modified set of processing requests to the validation computing system for batch processing validation before receiving an approval from the requesting computing system indicating that the modified processing request has been accepted;

receiving the approval from the requesting computing system and a validation result from the validation computing system indicating that the modified processing request is valid; and authenticating the modified processing request based on the approval from the requesting computing system and the validation result from the validation computing system.

8. The method of claim 7, wherein the second model comprises a machine learning model trained to generate modified processing requests that correct errors in processing requests, the method further comprising:

generating, via the machine learning model, the modified processing request and a probability associated with the modified processing request, wherein the probability satisfies a confidence threshold, wherein transmitting the modified set of processing requests to the validation computing system comprises, based on the probability satisfying the confidence threshold, transmitting the modified set of processing requests to the validation computing system before receiving the approval from the requesting computing system indicating that the modified processing request has been accepted.

9. The method of claim 8, further comprising:

generating, via the machine learning model, a second modified processing request and a second confidence level associated with the modified processing request, the second modified processing request being a replacement for a second processing request of a second set of processing requests that are received from the requesting computing system and scheduled to be sent for batch processing validation at the validation computing system, wherein the second confidence level associated with the modified processing request fails to satisfy the confidence threshold; and based on the second confidence level associated with the modified processing request failing to satisfy the confidence threshold, determining not to transmit the second modified processing request to the validation computing system before receiving a given approval from the requesting computing system indicating the second modified processing request has been accepted, and instead transmitting the second modified processing request to the validation computing system after receiving the given approval from the requesting computing system.

10. The method of claim 7, further comprising:

inputting the set of processing requests into an anomaly detection model; and based on inputting the set of processing requests into the anomaly detection model, generating, via the anomaly detection model, output indicating that a volume of processing requests received from the first computing system satisfies a threshold.

11. The method of claim 7, further comprising:

generating, via the second model, at least one modified processing request to replace at least one processing request scheduled to be sent to the validation computing system;

transmitting, in parallel, (i) at least one approval request for acceptance of the at least one modified processing request to the requesting computing system and (ii) the at least one modified processing request to the validation computing system before receiving, from the requesting computing system, an indication of whether the at least one modified processing request has been accepted;

receiving a given indication from the requesting computing system that the at least one modified processing request has not been accepted, and receiving at least one validation result from the validation computing system indicating that the at least one modified processing request is valid; and determining not to authenticate the at least one modified processing request based on the given indication, despite receiving the at least one validation result from the validation computing system indicating that that the at least one modified processing request is valid.

12. The method of claim 7, wherein the validation result indicates that the modified set of processing requests are error-free, and wherein authenticating the modified processing request comprises authenticating the modified set of processing requests based on the approval from the requesting computing system and the validation result from the validation computing system.

13. The method of claim 7, wherein the first model comprises a first machine learning model, and the second model comprises a second machine learning model.

14. A system comprising:

one or more processors programmed with instructions that, when executed by the one or more processors, cause operations comprising:

based on determining, via a first model, an error in a first processing request of a set of processing requests that are received from a first computing system and scheduled to be sent for batch processing validation at a second computing system, modifying the set of processing requests to include a modified processing request generated via a second model in lieu of including the first processing request, wherein the second model is trained to generate modified processing requests that correct errors in processing requests;

transmitting, in parallel, (i) an approval request for acceptance of the modified processing request to the first computing system and (ii) the modified set of processing requests to the second computing system for batch processing validation before receiving an approval from the first computing system indicating that the modified processing request has been accepted; and based on receiving the approval from the first computing system and receiving a validation result from the second computing system indicating that the modified processing request is valid, authenticating the modified processing request.

15. The system of claim 14, wherein the second model comprises a machine learning model trained to generate modified processing requests that correct errors in processing requests, the operations further comprising:

generating, via the machine learning model, the modified processing request and a probability associated with the modified processing request, wherein the probability satisfies a confidence threshold, wherein transmitting the modified set of processing requests to the second computing system comprises, based on the probability satisfying the confidence threshold, transmitting the modified set of processing requests to the second computing system before receiving the approval from the first computing system indicating that the modified processing request has been accepted.

16. The system of claim 15, the operations further comprising:
generating, via the machine learning model, a second modified processing request to replace a second processing request of a second set of processing requests that are received from the first computing system and scheduled to be sent for batch processing validation at the second computing system; and
based on a second confidence level associated with the modified processing request failing to satisfy the confidence threshold, determining not to transmit the second modified processing request to the second computing system before receiving a given approval from the first computing system indicating the second modified processing request has been accepted, and instead transmitting the second modified processing request to the second computing system after receiving the given approval from the first computing system.

17. The system of claim 14, the operations further comprising:
inputting the set of processing requests into an anomaly detection model; and
based on inputting the set of processing requests into the anomaly detection model, generating, via the anomaly detection model, output indicating that a volume of processing requests received from the first computing system satisfies a threshold.

18. The system of claim 14, the operations further comprising:
generating, via the second model, at least one modified processing request to replace at least one processing request scheduled to be sent to the second computing system;
transmitting, in parallel, (i) at least one approval request for acceptance of the at least one modified processing request to the first computing system and (ii) the at least one modified processing request to the second computing system before receiving, from the first computing system, an indication of whether the at least one modified processing request has been accepted; and
based on receiving a given indication from the first computing system that the at least one modified processing request has not been accepted, and despite receiving at least one validation result from the second computing system indicating that the at least one modified processing request is valid, determining not to authenticate the at least one modified processing request.

19. The system of claim 14, wherein the validation result indicates that the modified set of processing requests are error-free, and
wherein authenticating the modified processing request comprises authenticating the modified set of processing requests based on receiving the approval from the first computing system and receiving the validation result from the second computing system indicating that the modified set of processing requests are error-free.

20. The system of claim 14, wherein the first model comprises a first machine learning model, and the second model comprises a second machine learning model.

* * * * *